3,150,180
NEW 1-SUBSTITUTED-3-(p-VINYLBENZENE-SULFONYL) UREAS
David Frank Hayman, Vladimir Petrow, and Oliver Stephenson, London, England, assignors to The British Drug Houses Limited
No Drawing. Filed May 28, 1962, Ser. No. 197,934
Claims priority, application Great Britain May 29, 1961
9 Claims. (Cl. 260—553)

This invention relates to organic compounds and has particular reference to 1-substituted-3-(p-vinylbenzene-sulphonyl) ureas.

It is an object of the present invention to provide as new compounds 1-substituted-3-(p-vinylbenzenesulphonyl) ureas having the general formula

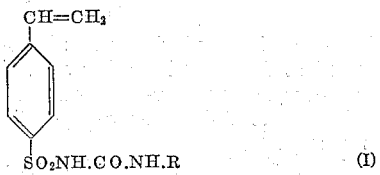

where R is an alkyl or substituted alkyl group containing up to 18 carbon atoms, an aralkyl group, an aryloxyalkyl group, an aryl or substituted aryl group, or an alicyclic group. Thus R may include such groups as alkoxyalkyl or alkylthioalkyl (for example $-CH_2.CH_2.S.C_2H_5$) or aralkyl groups such as benzyl or β-phenethyl or aryloxyalkyl groups such as β-phenoxyethyl or γ-phenoxypropyl, aryl groups such as phenyl or o-tolyl or alicyclic groups such as cyclopentyl or cyclohexyl; R may also be a reduced aralkyl group such as hexahydrobenzyl or β-hexahydrophenethyl.

The compounds of the present invention represent a new group of sulphonyl ureas some of which show hypoglycaemic activity on oral administration thereby rendering them of value in the treatment of conditions characterised by a raised blood sugar. Thus, for example, they may be used to control the hyperglycaemia of the experimental pancreatectomised dog. They may also be used to control hyperglycaemia in the obese middle-aged diabetic. Other uses will be apparent to those skilled in the art.

The invention also provides the following specific new 1-substituted-3-(p-vinylbenzenesulphonyl) ureas:

1-n-propyl-3-(p-vinylbenzenesulphonyl) area (I; R=n-propyl);
1-n-butyl-3-(p-vinylbenzenesulphonyl) urea (I; R=n-butyl);
1-cyclohexyl-3-(p-vinylbenzenesulphonyl) urea (I; R=cyclohexyl);
1-n-hexyl-3-(p-vinylbenzenesulphonyl) urea (I; R=n-hexyl);
1-cyclo-pentyl-3-(p-vinylbenzenesulphonyl) urea (I; R=cyclopentyl);
1-benzyl-3-(p-vinylbenzenesulphonyl) urea (I; R=n-benzyl);
1-cyclo-heptyl-3-(p-vinylbenzenesulphonyl) urea (I; R=cycloheptyl);
1-hexahydrophenethyl-3-(p-vinylbenzenesulphonyl) urea (I; R=hexahydrophenethyl);

which compounds are of value on account of their potent hypoglycaemic properties. Thus, for example, in the rabbit assay the n-butyl compound (I; R=n-butyl) is a more potent hypoglycaemic agent than the widely used anti-diabetic drugs 1-n-propyl-3-(p-chlorobenzenesulphonyl) urea ("Chlorpropamide") or 1-n-butyl-3-(p-toluenesulphonyl) urea ("Tolbutamide"). They consequently possess an important advantage over the compounds of prior art.

According to the present invention there is provided a process for the preparation of 1-substituted-3-(p-vinyl-benzenesulphonyl) ureas having the general formula

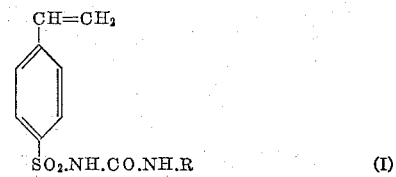

where R is an alkyl or substituted alkyl group containing up to 18 carbon atoms, an aralkyl group, an aryloxyalkyl group, aryl or substituted aryl group, or an alicyclic group, which process comprises reacting p-vinylbenzenesulphonamide with the appropriate isocyanate in an organic solvent and in the presence of an equivalent of alkali. The organic solvent may be equeous actone, aqueous tetrahydrofuran or aqueous dioxan. The alkali may be sodium hydroxide or potassium hydroxide and the reaction is preferably carried out at a temperature between 0° and 30° C.

Following is a description by way of example of methods of carrying the invention into effect.

*Example 1*

(a) Chlorosulphonyl-β-phenethylbromide [cf. G. E. Inskeep and R. Deanin (J. Amer. Chem. Soc., 1947, 69, 2237–2238)]: 2-phenethylbromide (160.4 g.) was added with stirring during 1.5 hours to chlorosulphonic acid (510 g.) with external cooling to keep the temperature below 27° C. After a further hour at room temperature the mixture was poured with stirring onto crushed ice. The semi-solid product was extracted with chloroform and the extract washed with dilute sodium bicarbonate solution, then with water and dried with anhydrous calcium chloride. The chloroform was distilled off and the residue oil was distilled under reduced pressure to yield (i) a small forerun (15 g.), B.P. up to 160° C. at 0.8 mm., and (ii) the product (172 g.), B.P. 160 to 165° C. at 0.8 mm., which solidified rapidly on standing.

(b) p-Sulphamoyl-β-phenethylbromide: The foregoing sulphonchloride (170 g.) was added dropwise during 30 minutes to aqueous ammonia (600 ml., d=0.880) with rapid stirring. After a further one hour the solids were collected, washed with ice-cold water and dried at 95° C. Yield, 137 g., M.P. 164 to 170° C. Crystallisation from ethanol (1100 ml.) furnished the pure product, M.P. 186 to 188° C.

(c) p-Vinylbenzene sulphonamide: A solution of the foregoing sulphonamide (18.1 g.) in ethanol (680 ml.) was treated with a solution of potassium hydroxide (77 g.) in ethanol (1 litre) and the bulk of the ethanol distilled off at atmospheric pressure. The residue was diluted with water (1.5 l.) and acidified with concentrated hydrochloric acid. The product was collected and dried. It (9.7 g.) had M.P. 140 to 142° C., and was essentially pure. A sample crystallised from water had M.P. 140 to 141° C.

1-ethyl-3-(p-vinylbenzenesulphonyl) urea: A solution of p-vinylbenzene sulphonamide (7.3 g.) in acetone (90 ml.) was treated with a solution of sodium hydroxide (1.6 g.) in the minimum volume of water. The mixture was cooled to 0° C., stirred and treated with ethyl isocyanate (3.13 g.). After a further hour the cooling bath was removed and the mixture stirred at room temperature for 6 hours, when it was poured on to crushed ice and acidified to pH 7 with acetic acid. No unchanged sulphonamide separated, so the pH of the solution was adjusted to 2–3 by the addition of hydrochloric acid. The product which separated was collected, washed with cold water and dried at 90 to 95° C. It (7.8 g.) had M.P. 99 to 101° C. A sample crystallised from benzene-light petroleum (B.P. 60 to 80° C.) had M.P. 100 to 102° C.

*Example 2*

1-n-propyl-3-(-p-vinylbenzenesulphonyl) urea was obtained in 85 percent yield by reaction of n-propylisocyanate with p-vinylbenzene sulphonamide in aqueous acetone containing one equivalent of sodium hydroxide at 0° C. exactly as described in Example 1. It had M.P. 105 to 106° C., after crystallisation from benzene-light petroleum (B.P. 60 to 80° C.).

*Example 3*

1-n-butyl-3-(p-vinylbenzenesulphonyl) urea: A solution of p-vinylbenzene sulphonamide (12.8 g.) in acetone (160 ml.) was treated with a solution of sodium hydroxide (2.8 g.) in the minimum volume of water. The mixture was cooled to 0° C., stirred and treated with n-butylisocyanate (7.65 g.). After 30 minutes the cooling bath was removed and the mixture stirred at room temperature for 5 hours. It was then poured on to ice and neutralised (pH 7) by the addition of acetic acid. It was filtered to remove a small amount of unreacted sulphonamide then the filtrate was cooled to 0° C. and adjusted to pH 3 by the addition of concentrated hydrochloric acid. The product which separated was washed with cold water and dried at 90 to 95° C. It had M.P. 112 to 114° C. (yield 17.2 g.). A portion crystallised from aqueous ethanol had M.P. 117 to 117.5° C. (corr.).

*Example 4*

1-sec.-butyl-3-(p-vinylbenzenesulphonyl) urea was prepared exactly as for the n-butyl analogue described in the preceding example using sec.-butyl isocyanate in place of n-butyl isocyanate. It was obtained in 90 percent yield and had M.P. 133 to 134° C., after crystallisation from aqueous ethanol.

*Example 5*

1-cyclohexyl-3-(p-vinylbenzenesulphonyl) urea was prepared by reaction of p-vinylbenzene sulphonamide with cyclohexyl isocyanate in aqueous acetone containing one equivalent of sodium hydroxide as described in Example 1. It was obtained in 90 percent yield and had M.P. 169.5 to 170° C. (corr.) after crystallisation from aqueous ethanol.

*Example 6*

1-phenyl-3-(p-vinylbenzenesulphonyl) urea was prepared by reaction of p-vinylbenzene sulphonamide with phenyl isocyanate in aqueous acetone in the presence of one equivalent of sodium hydroxide as described in Example 1. The product, obtained in 94 percent yield, had M.P. 168 to 169° C., after crystallisation from aqueous ethanol.

*Example 7*

1-benzyl-3-(p-vinylbenzenesulphonyl) urea was obtained in 93 percent yield by reaction of benzyl isocyanate with p-vinylbenzene sulphonamide in aqueous acetone containing one equivalent of sodium hydroxide, as described in Example 1. It had M.P. 158° C., after crystallisation from aqueous ethanol.

*Example 8*

1-(β-phenethyl)-3-(p-vinylbenzenesulphonyl) urea was obtained in 92 percent yield by reaction of β-phenethylisocyanate with p-vinylbenzene sulphonamide under the conditions described in earlier examples. It had M.P. 137 to 138° C., after crystallisation from aqueous ethanol.

*Example 9*

1-n-pentyl-3-(p-vinylbenzenesulphonyl) urea was obtained in 92 percent yield by reaction of n-pentylisocyanate with p-vinylbenzenesulphonamide as described in Example 1. It had M.P. 86 to 88° C. after crystallisation from aqueous ethanol.

*Example 10*

1-n-hexyl-3-(p-vinylbenzenesulphonyl) urea was prepared by reaction of n-hexylisocyanate with p-vinylbenzenesulphonamide in aqueous acetone containing one equivalent of sodium hydroxide. It had M.P. 139 to 140° C. after crystallisation from aqueous ethanol.

*Example 11*

1-n-heptyl-3-(p-vinylbenzenesulphonyl) urea was prepared by reaction of n-heptylisocyanate with p-vinylbenzenesulphonamide, as described in earlier examples. It had M.P. 118 to 119° C. after crystallisation from aqueous ethanol.

The n-heptylisocyanate used in this reaction was prepared by reaction of n-heptylamine hydrochloride with phosgene in chloronaphthalene. It had B.P. 184° C. at 760 mm. and $n_D^{26}$ —1.4295.

*Example 12*

1-n-octyl-3-(p-vinylbenzenesulphonyl) urea was prepared as described in earlier examples by reaction of n-octylisocyanate with p-venylbenzenesulphonamide. It had M.P. 92 to 94° C. after crystallisation from aqueous methanol.

The n-octylisocyanate used in the reaction was prepared by reaction of n-octylamine hydrochloride with phosgene in chloronaphthalene. It had B.P. 196° C., at 760 mm. and $n_D^{22}$ —1.4460.

*Example 13*

1 - (α-ethylpropyl)-3-(p-vinylbenzenesulphonyl) urea was prepared by reaction of α-ethylpropylisocyanate with p-vinylbenzene sulphonamide. It had M.P. 134 to 135° C. after crystallisation from aqueous ethanol.

*Example 14*

1 - (α-propylbutyl)-3-(p-vinylbenzenesulphonyl) urea was prepared by reaction of α-propylbutylisocyanate with p-vinylbenzene sulphonamide. It had M.P. 158° C. after crystallisation from aqueous ethanol.

*Example 15*

1-t-butyl-3-(p-vinylbenzenesulphonyl) urea was obtained in 90 percent yield by reaction of t-butylisocyanate with p-vinylbenzenesulphonamide as described in earlier examples. It had M.P. 134 to 135° C. after crystallisation from aqueous ethanol.

*Example 16*

1-t-pentyl-3-(p-vinylbenzenesulphonyl) urea was prepared by reaction of t-pentylisocyanate with p-vinylbenzene sulphonamide. It had M.P. 118 to 119° C. after crystallisation from aqueous ethanol.

The t-pentylisocyanate used in the reaction was prepared by reaction of t-pentylamine hydrochloride with phosgene in orthodichlorobenzene. It had B.P. 110 to 114° C. at 760 mm.

*Example 17*

1-isopropyl-3-(p-vinylbenzenesulphonyl) urea was prepared by reaction of iso-propylisocyanate with p-vinylbenzene sulphonamide. It had M.P. 112 to 113° C. after crystallisation from aqueous ethanol.

*Example 18*

1-isobutyl-3-(p-vinylbenzenesulphonyl) urea was prepared by reaction of iso-butylisocyanate with p-vinylbenzene sulphonamide. It had M.P. 150 to 151° C. after crystallisation from aqueous ethanol.

*Example 19*

1-isopentyl-3-(p-vinylbenzenesulphonyl) urea was prepared by reaction of iso-pentylisocyanate with p-vinylbenzene sulphonamide. It had M.P. 113 to 114° C. after crystallisation from aqueous ethanol.

*Example 20*

1-isohexyl-3-(p-vinylbenzenesulphonyl) urea was obtained in 87 percent yield by reaction of isohexylisocyanate with p-vinylbenzenesulphonamide as described in earlier examples. It had M.P. 113 to 114° C. after crystallisation from aqueous ethanol.

*Example 21*

1-cyclopentyl-3-(p-vinylbenzenesulphonyl) urea was prepared by reaction of cyclopentylisocyanate with p-vinylbenzenesulphonamide in aqueous acetone containing one equivalent of sodium hydroxide. It had M.P. 161.5 to 162° C. (corr.) after crystallisation from aqueous ethanol.

Cyclopentylisocyanate, used in the above reaction was prepared by the action of phosgene on cyclopentylamine hydrochloride in orthodichlorobenzene. It had B.P. 145 to 146° C. at 760 mm. and $n_D^{26}$—1.4470.

*Example 22*

1-cycloheptyl-3-(p-vinylbenzenesulphonyl) urea was prepared by reaction of cycloheptylisocyanate with p-vinylbenzene sulphonamide as described in earlier examples. It had M.P. 146.5 to 147° C. (corr.) after crystallisation from aqueous ethanol.

Cycloheptylisocyanate, which was used in the above reaction was prepared by reaction of phosgene with cycloheptylamine hydrochloride in chloronaphthalene. It had B.P. 69 to 70° C. at 18 mm. and $n_D^{27}$—1.4670.

*Example 23*

1-cyclooctyl-3-(p-vinylbenzenesulphonyl) urea was obtained by reaction of cyclooctylisocyanate with p-vinylbenzene sulphonamide using the method described in earlier examples. It had M.P. 140 to 142° C. after crystallisation from aqueous ethanol. The cyclooctylisocyanate used in the foregoing reaction was prepared by reaction of cyclooctylamine hydrochloride with phosgene in chloronaphthalene. It had B.P. 85 to 87° C. at 7 mm and $n_D^{25}$—1.4814.

*Example 24*

1-hexahydrobenzyl-3-(p-vinylbenzenesulphonyl) urea was prepared by reaction of hexahydrobenzylisocyanate with p-vinylbenzene sulphonamide as described in earlier examples. It had M.P. 170° C. after crystallisation from ethanol.

Hexahydrobenzylisocyanate was prepared by reaction of hexahydrobenzylamine hydrochloride with phosgene in chloronaphthalene. It had B.P. 196 to 200° C. at 760 mm. and $n_D^{25}$—1.4787.

*Example 25*

1-hexahydrophenethyl-3-(p-vinylbenzenesulphonyl) urea was prepared by reaction of hexahydrophenethyl isocyanate with p-vinylbenzene sulphonamide. It had M.P. 101 to 102° C. after crystallisation from aqueous ethanol.

Hexahydrophenethylisocyanate was prepared by reaction of hexahydrophenethylamine hydrochloride with phosgene in chloronaphthalene. It had B.P. 218 to 224° C. at 760 mm. and $n_D^{22}$—1.4951.

*Example 26*

1-allyl-3-(p-vinylbenzenesulphonyl) urea was prepared by reaction of allylisocyanate with p-vinylbenzene sulphonamide in aqueous acetone containing one equivalent of sodium hydroxide. It had M.P. 131 to 132° C. after crystallisation from aqueous ethanol.

*Example 27*

1-β-phenoxyethyl-3-(p-vinylbenzenesulphonyl) urea was prepared by reaction of β-phenoxyethylisocyanate with p-vinylbenzene sulphonamide. It had M.P. 168 to 169° C. after crystallisation from ethanol.

β-Phenoxyethylisocyanate, used in the above preparation was obtained by reaction of β-phenoxyethylamine hydrochloride with phosgene in chlorobenzene. It had B.P. 122° C. at 7.5 mm.

*Example 28*

1-α-naphthyl-3-(p-vinylbenzenesulphonyl) urea was prepared by reaction of p-vinylbenzenesulphonamide with α-naphthylisocyanate, using the method described in earlier examples. It had M.P. 161° C. after crystallisation from a mixture of acetone and light petroleum (B.P. 60 to 80° C.).

*Example 29*

1-p-tolyl-3-(p-vinylbenzenesulphonyl) urea was prepared by reaction of p-tolylisocyanate with p-vinylbenzene sulphonamide. It had M.P. 169 to 170° C. after crystallisation from a mixture of acetone and light petroleum (B.P. 60 to 80° C.).

*Example 30*

1-(p-chlorophenyl)-3-(p-vinylbenzenesulphonyl) urea was prepared by reaction of p-chlorophenylisocyanate with p-vinylbenzenesulphonamide. It had M.P. 178° C. after crystallisation from a mixture of acetone and light petroleum (B.P. 60 to 80° C.).

*Example 31*

1-(p-bromophenyl)-3-(p-vinylbenzenesulphonyl) urea was prepared by reaction of p-bromophenylisocyanate with p-vinylbenzenesulphonamide. It had M.P. 178 to 180° C. after crystallisation from a mixture of acetone and light petroleum (B.P. 60 to 80° C.).

*Example 32*

1-(p-methoxyphenyl)-3-(p-vinylbenzenesulphonyl) urea was prepared by reaction of p-methoxyphenylisocyanate with p-vinylbenzenesulphonamide. It had M.P. 138 to 139° C. after crystallisation from aqueous methanol.

*Example 33*

1-(p-ethoxyphenyl)-3-(p-vinylbenzenesulphonyl) urea was prepared by reaction of p-ethoxyphenylisocyanate with p-vinylbenzenesulphonamide. It had M.P. 166 to 167° C. after crystallisation from a mixture of acetone and light petroleum (B.P. 60 to 80° C.).

*Example 34*

1-n-propoxypropyl-3-(p-vinylbenzenesulphonyl) urea was prepared by reaction of n-propoxypropylisocyanate with p-vinylbenzenesulphonamide. It had M.P. 120 to 122° C. after crystallisation from ether.

*Example 35*

1-iso-butoxypropyl-3-(p-vinylbenzenesulphonyl) urea was prepared by reaction of iso-butoxypropylisocyanate with p-vinylbenzenesulphonamide. It had M.P. 96 to 97° C. after crystallisation from a mixture of ether and light petroleum (B.P. 40 to 60° C.).

*Example 36*

1-n-butoxypropyl-3-(p-vinylbenzenesulphonyl) urea was prepared by reaction of n-butoxypropylisocyanate with p-vinylbenzenesulphonamide. It had M.P. 70 to 72° C. after crystallisation from a mixture of ether and light petroleum (B.P. 40 to 60° C.).

*Example 37*

1-cyclohexyloxypropyl-3-(p-vinylbenzenesulphonyl) urea was prepared by reaction of cyclohexyloxypropylisocyanate with p-vinylbenzenesulphonamide. It had M.P. 97 to 99° C. after crystallisation from a mixture of ether and light petroleum (B.P. 40 to 60° C.).

Example 38

1-ethylthioethyl-3-(p-vinylbenzenesulphonyl) urea was prepared by reaction of ethylthioethylisocyanate with p-vinylbenzenesulphonamide in aqueous acetone containing one equivalent of sodium hydroxide. It had M.P. 109 to 110° C. after crystallisation from a mixture of acetone and light petroleum (B.P. 40 to 60° C.).

Ethylthioethylisocyanate used in the reaction was obtained by reaction of ethylthioethylamine hydrochloride with phosgene in toluene. It had B.P. 188 to 190° C. at 760 mm.

We claim:
1. A compound of the formula

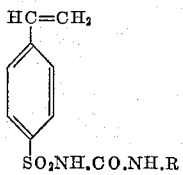

wherein R is selected from the group consisting of alkyl of up to 18 carbon atoms, cycloalkyl of 5 to 8 carbon atoms, cyclohexyloxypropyl, propoxypropyl, butoxypropyl, ethylthioethyl, hexahydrobenzyl, hexahydrophenethyl, phenoxyethyl, phenoxypropyl, tolyl, allyl, phenyl, naphthyl, benzyl, phenethyl, methoxyphenyl, ethoxyphenyl, propoxyphenyl, chlorophenyl and bromophenyl.

2. 1-n-proply-3-(p-vinylbenzenesulphonyl) urea.
3. 1-n-butyl-3-(p-vinylbenzenesulphonyl) urea.
4. 1-cyclohexyl-3-(p-vinylbenzenesulphonyl) urea.
5. 1-n-hexyl-3-(p-vinylbenzenesulphonyl) urea.
6. 1-cyclo-pentyl-3-(p-vinylbenzenesulphonyl) urea.
7. 1-benzyl-3-(p-vinylbenzenesulphonyl) urea.
8. 1-cyclo-heptyl-3-(p-vinylbenzenesulphonyl) urea.
9. 1 - hexahydrophenethyl - 3 - (p - vinylbenzenesulphonyl) urea.

References Cited in the file of this patent
UNITED STATES PATENTS
2,968,158    Ruschig et al. _____ Jan. 17, 1961